United States Patent [19]

Kobayashi

[11] Patent Number: 5,136,441
[45] Date of Patent: Aug. 4, 1992

[54] POSITION CONTROL DEVICE FOR POSITIONING MAGNETIC HEAD ON SELECTED TRACK

[75] Inventor: Hisakichi Kobayashi, Kawasaki, Japan

[73] Assignee: Fujitsu Limited, Kanagawa, Japan

[21] Appl. No.: 511,473

[22] Filed: Apr. 19, 1990

[30] Foreign Application Priority Data

Apr. 20, 1989 [JP] Japan .................... 1-098692

[51] Int. Cl.$^5$ .................... G11B 5/55; G11B 21/08
[52] U.S. Cl. .................... 360/78.12; 360/77.02.77.05;
360/78.04; 369/32; 369/44.29
[58] Field of Search .................... 360/77.02–77.11,
360/78.04–78.14; 369/32, 43, 44.27–44.31,
44.35

[56] References Cited

U.S. PATENT DOCUMENTS

| 4,679,103 | 7/1987 | Workman | 360/78.07 |
| 4,949,201 | 8/1990 | Abed | 360/77.04 |
| 4,963,806 | 10/1990 | Shinohara et al. | 360/77.05 |

FOREIGN PATENT DOCUMENTS 63-9083  1/1988  Japan .................... 360/78.06

Primary Examiner—Aristotelis Psitos
Assistant Examiner—Steven R. Garland
Attorney, Agent, or Firm—Nikaido, Marmelstein, Murray & Oram

[57] ABSTRACT

A position control circuit for use in a servo circuit generate a position error signal corresponding to a position error between a head and a selected track of a disk at a time of position control and positions the head on the selected track. The position control circuit includes a) an integrator for integrating the position error, of the position of the head and the position of the selected track, to generate an integrated signal which is one component of the position error signal generated by the position control circuit and b) an integral control circuit for stopping the integral action of the integrator for a predetermined period shorter than a one-track seek time after the position control is initiated.

9 Claims, 16 Drawing Sheets

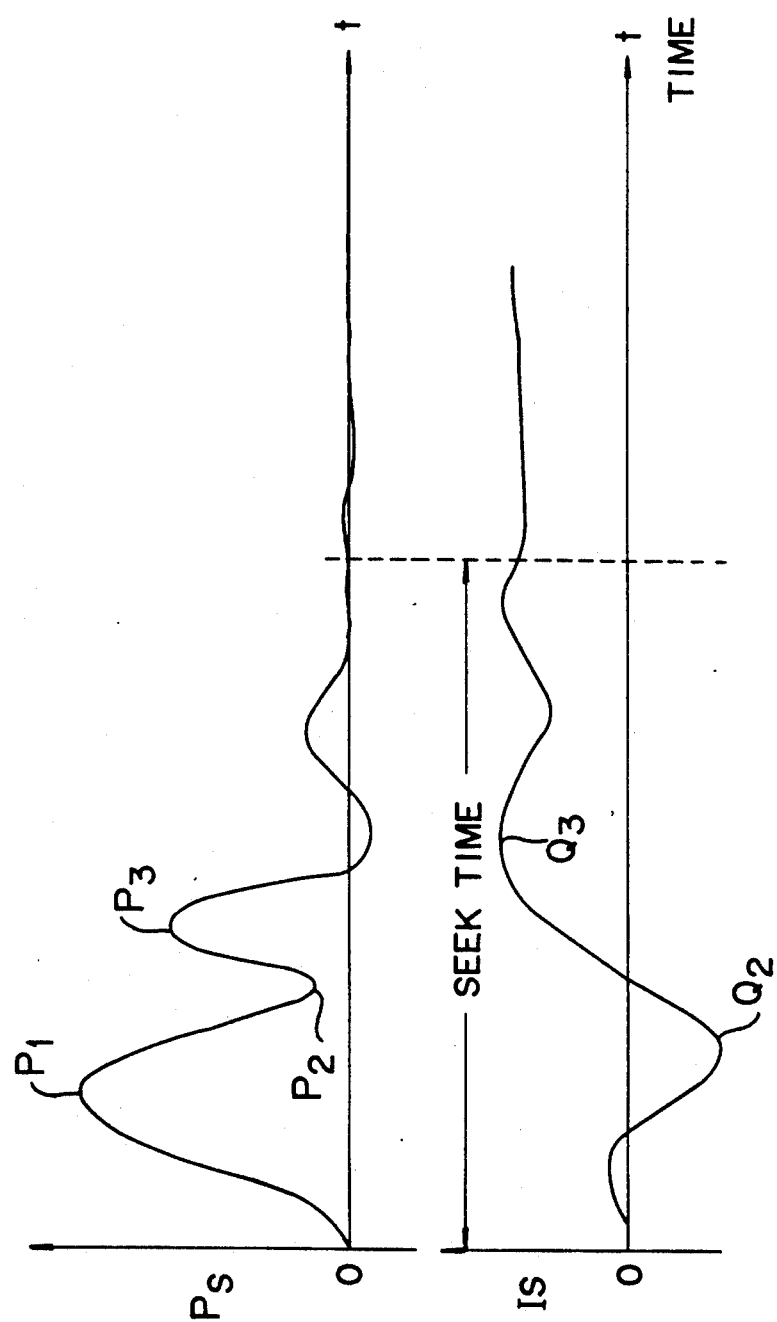

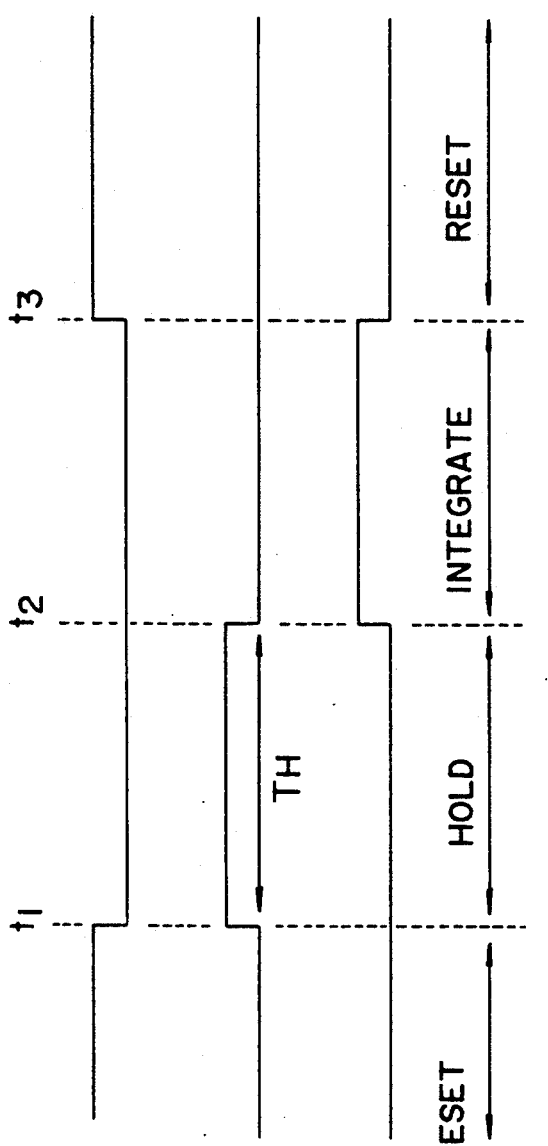

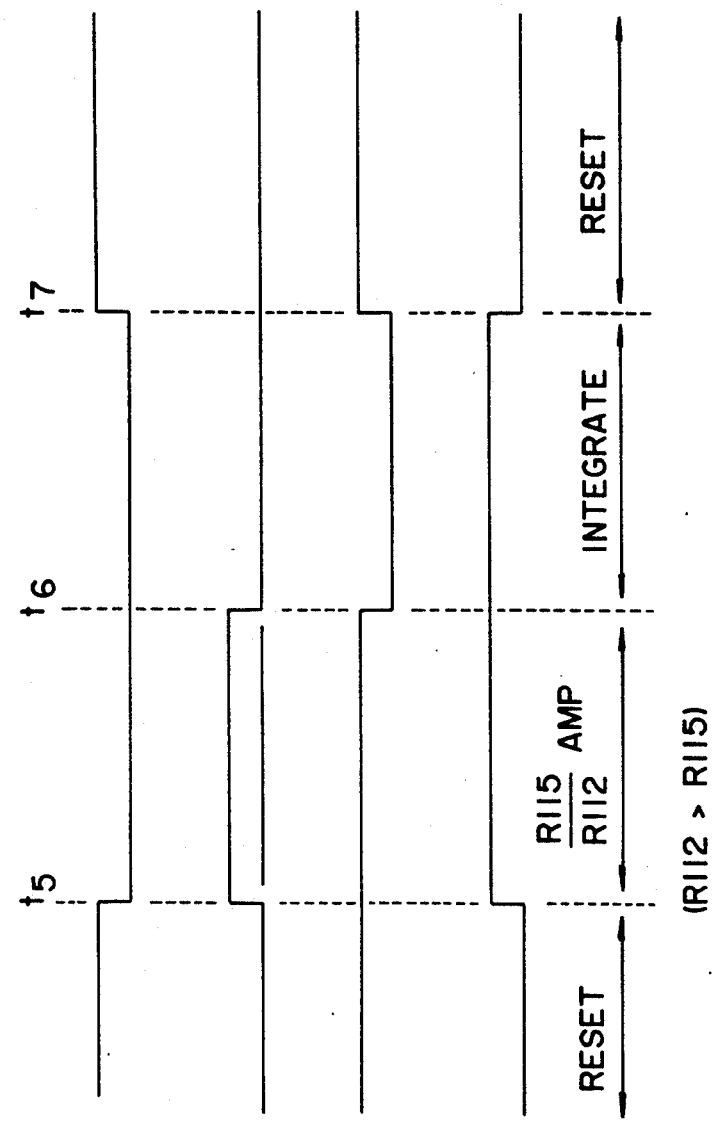

POSITION CONTROL DEVICE FOR POSITIONING MAGNETIC HEAD ON SELECTED TRACK

BACKGROUND OF THE INVENTION

The present invention relates to a position control circuit for positioning a magnetic read-write head on a selected track of a magnetic disk in a magnetic disk device using a servo system for speed control and position control.

In a magnetic disk device, a magnetic head is positioned on a selected track by use of a servo system which performs a seek control. The head is then shifted to the selected track at high speed by performing speed control. Finally, the head is accurately positioned on the selected track by performing position control. (In multi-disk devices, tracks on disks with the same number of tracks are referred to as cylinders. The present invention does not depend on the number of disks and thus the term track is used in the following description.) A position control circuit includes a differentiating circuit, an integrating circuit and a proportional circuit for performing the position control by a proportional plus integral plus differential action, i.e., a PID action.

FIG. 1 illustrates a position control circuit of a servo system for performing a seek control in a prior art magnetic disk device.

In FIG. 1, a servo circuit 10 and a servo-controlled system 20 are shown. The servo circuit 10 has a position control circuit 11. The other circuits are omitted. In the servo-controlled system 20, a magnetic read-write head 21 is moved on a disk 22 by a voice coil motor (hereinafter referred to as VCM) 23 to write on and read from the disk 22.

The position control circuit 11 has an integrating circuit 110, a differentiating circuit 120, a proportional circuit 130 and adders 140 and 150.

In this arrangement, the servo circuit 10 shifts the head 21 toward a selected track at high speed by means of speed control and then the control is switched from speed control to position control so that the head 21 is positioned on the selected track.

For the position control, the adder 140 produces a position signal Ps indicating the current position of the head 21 and an error signal ΔP indicating the difference between the current position of the head 21 and the selected track position Po.

In the error signal ΔP, the integrating circuit 110, the differentiating circuit 120 and the proportional circuit 130 perform the integral action, the differential action and the proportional (amplifying) action, respectively. Output signals of the integrating circuit 110, differentiating circuit 120 and proportional circuit 130 are added together to produce a position error signal $\Delta P_E$ as a result of the proportional plus integral plus differential action (PID action). The position error signal $\Delta P_E$ is amplified up to a predetermined power level and then applied to a VCM 23 of the servo-controlled system 20 to drive (move) the head 21. That is, the position control is performed by a position control loop comprised of the head 21, the position control circuit 11, the VCM 23 and the head 21, so that the head 21 is positioned on the selected track.

With recent advances in the high-speed version of track seek, a one-track seek is now considered, which utilizes the PID control by the position control circuit 11.

FIGS. 2A(a)-2A(b) illustrate normal operating waveforms in the position control for one-track seek. More specifically, FIG. 2A(a) illustrates an operating waveform of the position signal Ps and FIG. 2A(b) illustrates an output waveform of the integrating circuit 110. With external force applied to the head 21, the position signal Ps produces a transient oscillation as shown which rapidly converges on 0 by means of the PID action of the position control circuit 11. In that case the output (integrated signal IS) of the integrating circuit 110 will have a fixed level which corresponds to the position of the selected track.

However, when the external force applied to the servo-controlled system (head) varies and thus the head position signal Ps varies as shown in FIG. 9B(a), the variations are added in the integrator 110 so that the resulting integrated signal IS varies as shown in FIG. 9B(b). The output of the integrator 110 of the position control circuit 11 in the position control is mostly an integrated value of or external force applied to the head in an on-track state. The variation in the integrated signal IS causes the head position signal Ps to vary and the integrated signal IS is also further varied. It thus takes a long time for the position signal Ps and integrated signal IS to become stabilized, i.e., for a seek to be terminated.

The variation in external force refers to the variation in mechanical external force applied to the head 21. If the movement of the head 21, namely, the seek operation, is performed slowly, the external force will vary little. With a fast seek operation, the external force will vary transiently.

Although to achieve a high-speed seek, it is desirable for a track seek to be made while the PID control is performed the position control circuit of the prior art servo circuit has a problem that it is subject to the influence of variations in the external force because of the presence of the integrator. Hence, the settling of the head becomes unstable, thereby hindering stable fast track seek.

SUMMARY OF THE INVENTION

It is an object of the present invention to provide an improved position control circuit which excludes the influence of variations in external force on a magnetic head in an on-track state to stabilize the settling of the magnetic head even where a one-track seek is needed for a high-speed seek, thereby permitting a stable and fast seek operation.

A feature of the present invention resides in a position control circuit for use in a servo circuit for generating a position error signal corresponding to a position error between a head and a selected track of a disk at a time of position control and positioning the head on the selected track, comprising an integrator (110A) for integrating an error signal of the position of the head and the position of the selected track to generate an integrated signal which is one component of the position error signal that the position control circuit generates, and an integral control circuit for stopping the integral action of the integrator for a predetermined period shorter than one-track seek time after the position control is initiated.

DETAILED DESCRIPTION OF THE PREFERRED EMBODIMENTS

The position control circuit in the prior art servo circuit generates a position error signal $\Delta P_E$ on the basis of a PID action. With the proportional (P) action alone, when an external force (disturbance) is applied, an offset (steady-state error) will be produced in a steady-state position. The steady-state error will be decreased to 0 by the integral (I) action. Moreover, transient characteristics can be improved by adding the differential (D) action.

In this way, stable and fast positioning will generally be made possible by use of the position error signal $\Delta P_E$ generated by PID action.

However, a one-track seek under PID action will be greatly affected by variations in external force, causing the settling of a magnetic head to become unstable and increasing seek time.

Figures 2A, 2B:
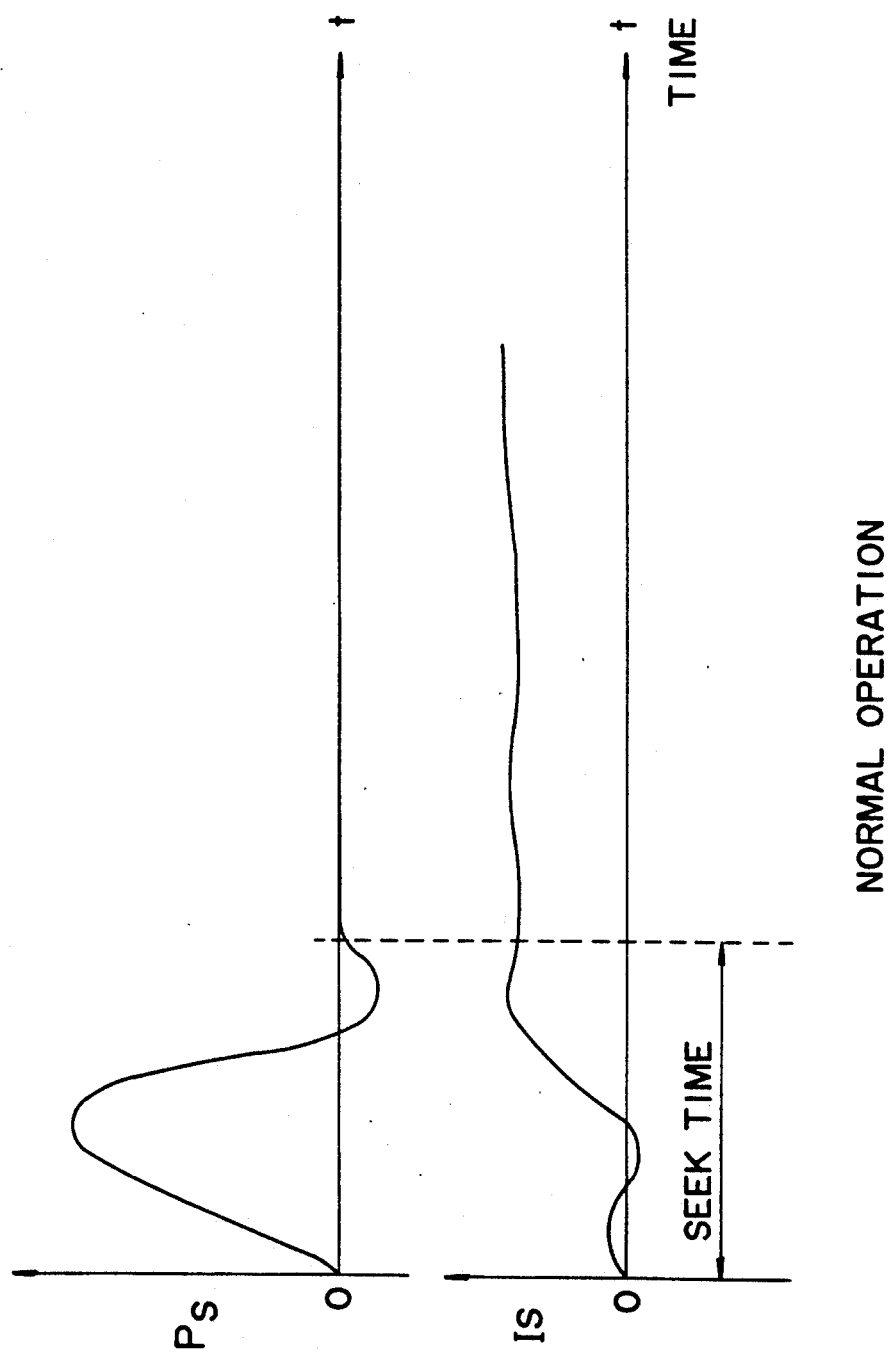

This is due to the integrator 110 provided in the position control circuit 11. That is, when a transient oscillation occurs with the magnetic head because of variations in external force, the amplitude of the head position signal Ps varies greatly, as shown by P1 in FIG. 2B(a). Since the varying position signal is integrated by the integrator 110, the integrated signal IS (and hence the position error signal $\Delta P_E$) from the integrator or varies to a large extent as shown by Q2 in FIG. 2B(b). The great variation Q2 in the integrated signal IS influences the position signal Ps to greatly lower its amplitude, as shown by P2 in FIG. 2B(a). The variations in the position signal Ps and the variations in the integrated signal IS influence each other so that both of the signals continue to oscillate as shown in FIGS. 2B(a)–2B(b). Thus, it takes a long time for both the signals to stabilize. Consequently, the seek time also becomes long.

Therefore, if the integrator 110 is arranged to be immune to the transient oscillation of the position signal Ps, then the variations in the output of the integrator will become small. Thus, the integrated signal IS (hence the position error signal $\Delta P_E$) output from the integrator and the position signal Ps can be stabilized quickly. That is, the settling of the head can be stabilized.

The present invention is made on the basis of such a concept and will be described below with reference to FIG. 3, which is a basic block diagram of the invention.

Figure 3:
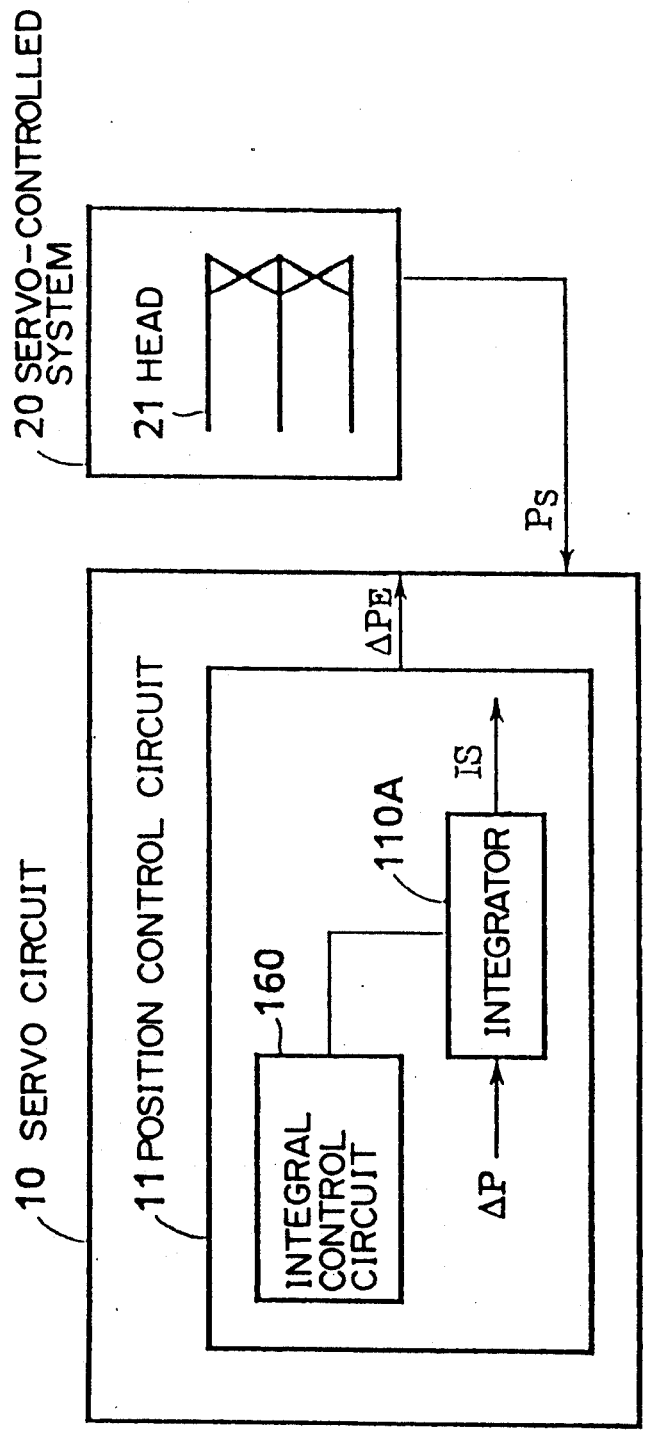
FIG. 3 is a schematic diagram illustrating a basic arrangement of the present invention.

In FIG. 3, 10 designates a servo circuit and 20 designates a servo-controlled system. In the servo circuit 10, a position control circuit 11 performs position control. Since the other circuits are not essential to the description of the present invention, they are omitted from FIG. 3. In the servo -controlled system 20, a magnetic head 21 reads from and writes to a magnetic disk 22.

Figure 1:
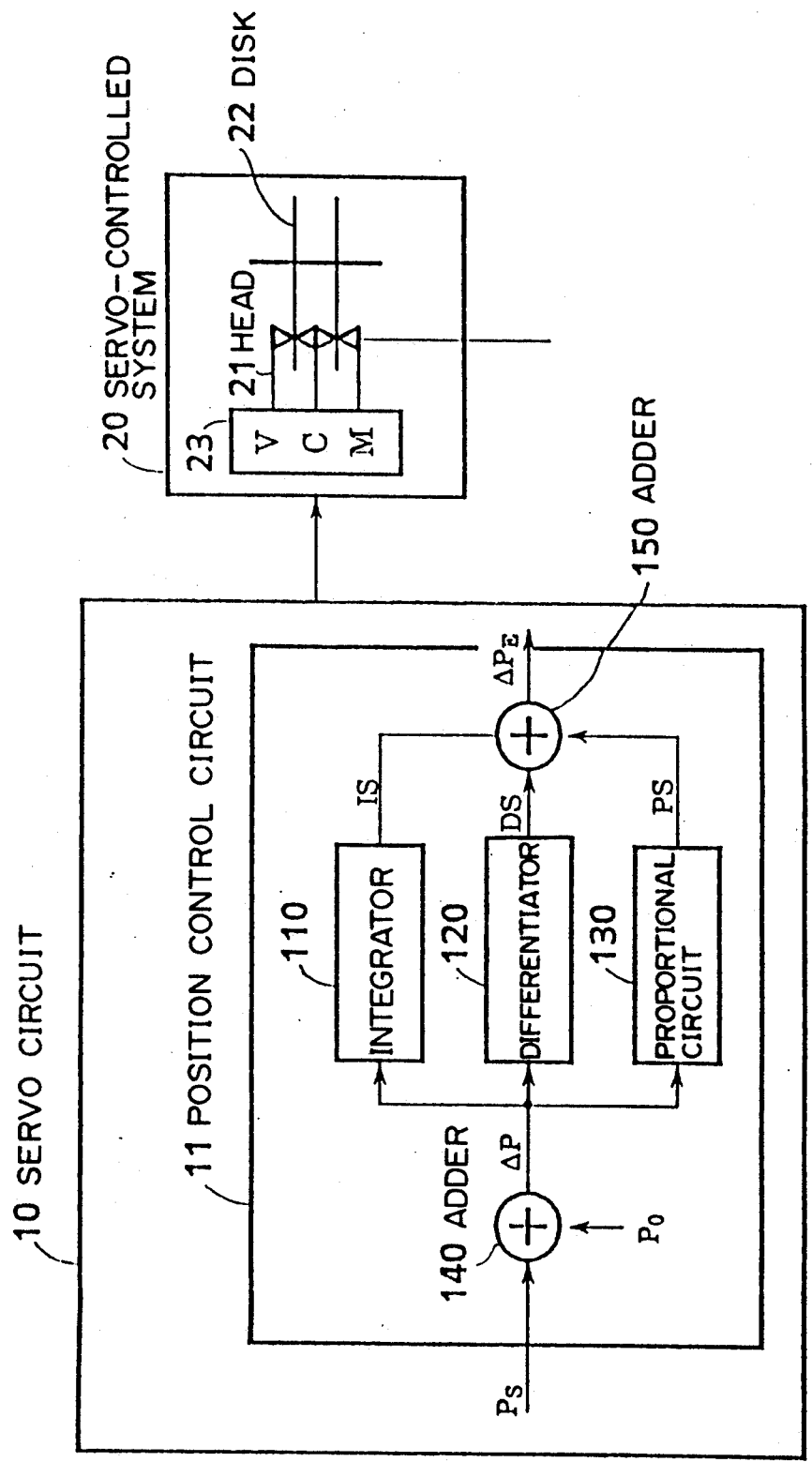
FIG. 1 is a schematic block diagram of a position control circuit of a prior art servo circuit, FIGS. 2A(a), 2A(b) and 2B(a), 2B(b) illustrate operating waveforms of the prior art position control circuit.

In the position control circuit 11, an integrator 110A integrates an error signal $\Delta P_E$ indicating a difference in position between the head 21 and a selected track in order to produce an integrated signal IS. This signal is one component of a position error signal $\Delta P_E$ generated by the position control circuit 11. The integrator is indicated at "110A" to be distinguished from the integrator of FIG. 1.

An integral control circuit 160 stops the integral action of the integrator 110A for a predetermined time less than one-track seek time after the position control is initiated.

The operation of the embodiment of the present invention shown in FIG. 3 will be described in conjunction with operating waveforms of FIGS. 4A–4C.

The servo circuit 10 allows the head 21 to make fast access to a selected cylinder containing a selected track by means of the speed control. On termination of the speed control, switching is made to the position control whereby the head is positioned on the selected track of the selected cylinder.

It is assumed that the head 21 oscillates because of a variation in external force when the position control is initiated. Hence, a large transient oscillation is produced in the position signal Ps, as shown in FIG. 4A.

Figure 4:
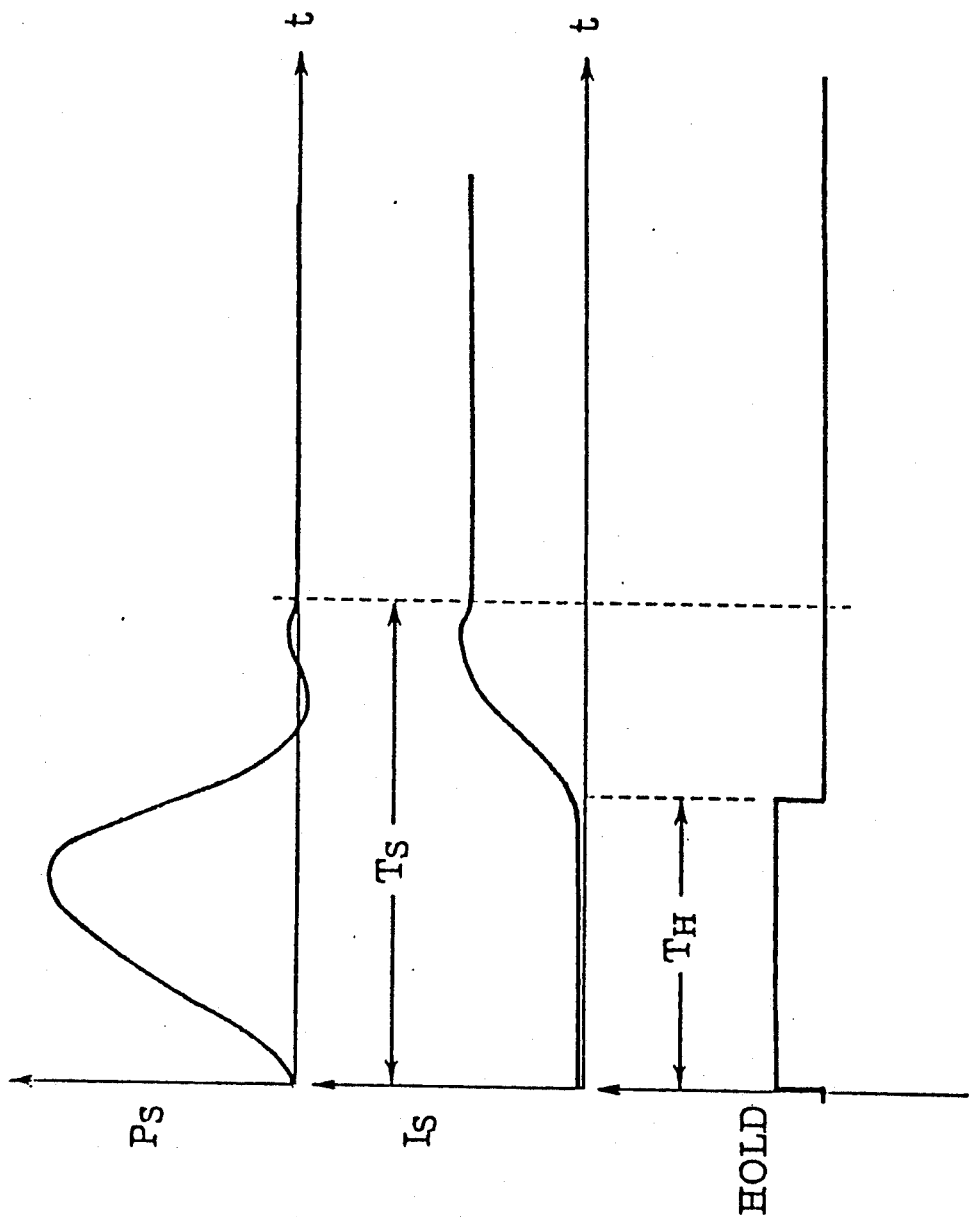
FIG. 4A–4C illustrate operating waveforms in the present invention.

The integral control circuit 160 also generates a HOLD signal as shown in FIG. 4C so as to stop the integral action of the integrator 110A for a predetermined time Th corresponding to a one-track seek time Ts of the head 21.

The one-track seek time Ts of the head 21 depends on the arrangement of the disk device. The time Th during which the integral action is stopped is experimentally determined so that the position control is not affected by variations in external force, while maintaining integral control characteristics. For example, the time Th is selected to be approximately 70% of Ts.

The integrator 110A initiates an integral action after time Th has elapsed from when the position control is initiated. Thus, even if the head 21 is subjected to a large transient oscillation, the integrator 110A can be made immune to the oscillation, thus producing no variation in the integrator output (integrated signal IS).

Therefore, the mutual influence between the position signal Ps of the head 21 and the integrated signal IS (hence the position error signal $\Delta P$) from the integrator 110A can be effectively suppressed and both of the signals can converge stably and rapidly, as shown in FIGS. 4A–4C.

As described above, the integral action of the integrator of the position control circuit is stopped for a predetermined period corresponding to a transient oscillation period of the head. Therefore, even if a large transient oscillation is produced in the head in an on-track state because of a variation in external force, the integrator can be made immune to the oscillation and thus perform stable, good integral action.

As a result, the mutual influence between the variation in the head position signal and the variation in the integrated signal (hence the position error signal) can be effectively avoided, thereby also stabilizing the settling of the head at the time of a fast seek, such as a one-track seek, and realizing a stable, fast seek.

Figure 5:
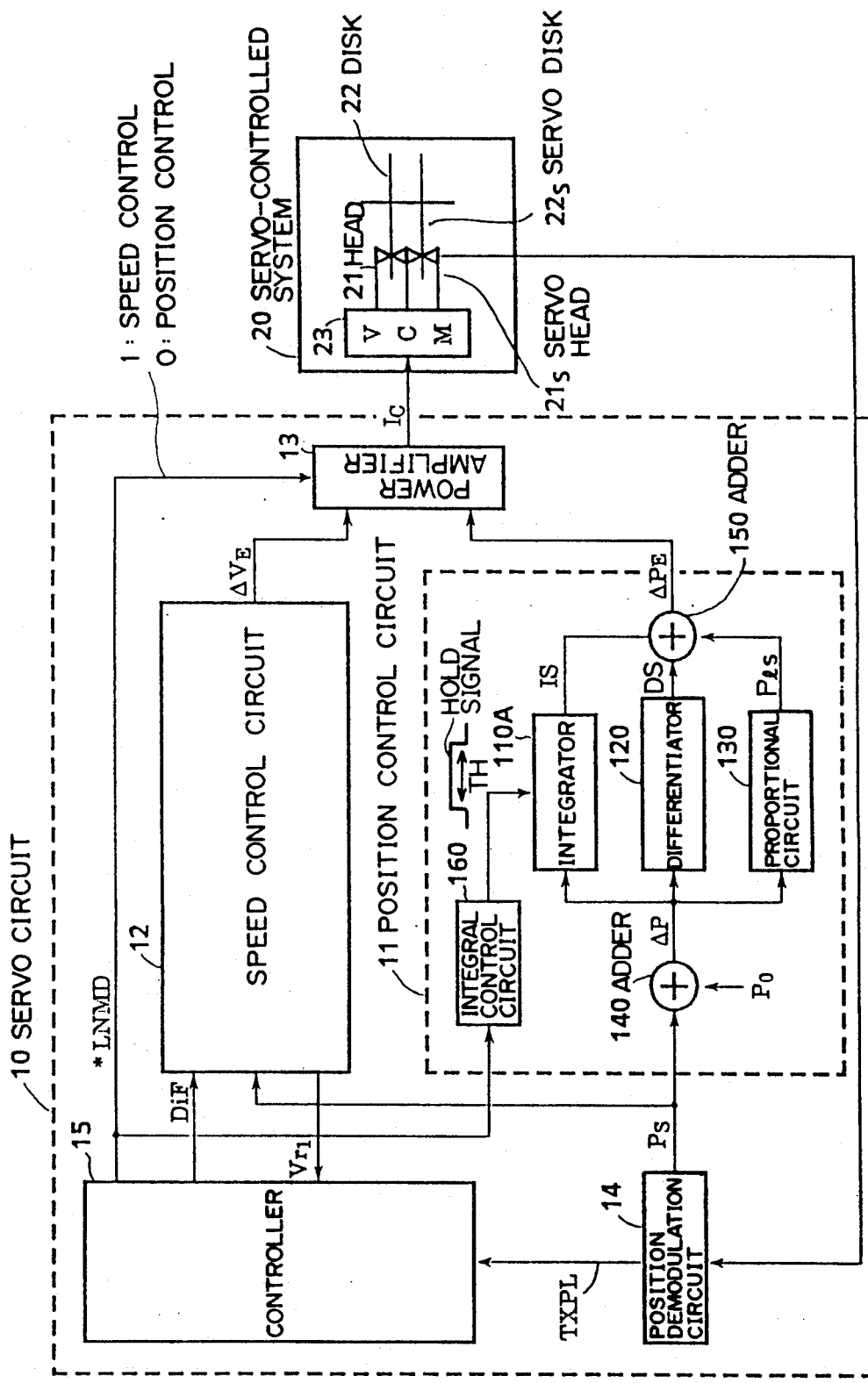
FIG. 5 is a block diagram of an embodiment of the present invention.
Figure 6A:
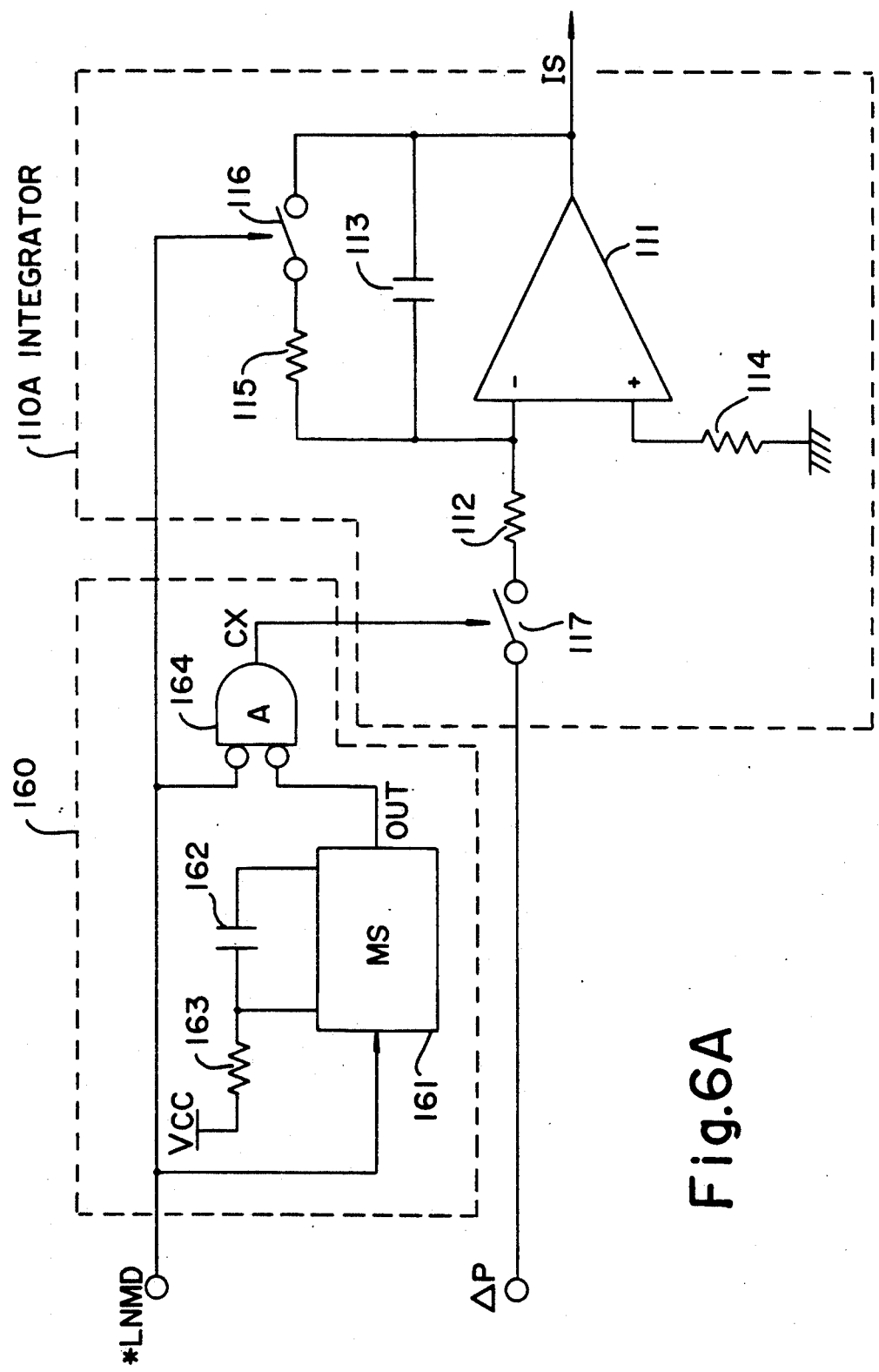
FIG. 6A illustrates specific arrangements of the integrator and the integral control circuit of FIG. 5, FIGS. 6B(a), 6B(b) and 6B(c) illustrate operating waveforms of the integrator and the integral control circuit of FIG. 5, FIGS. 7A and 7B are views of the servo controlled system of FIG. 5, FIGS. 7C(a) and 7C(b) are schematic diagrams of the magnetic head and the VCM of FIG. 5.
Figure 7A:
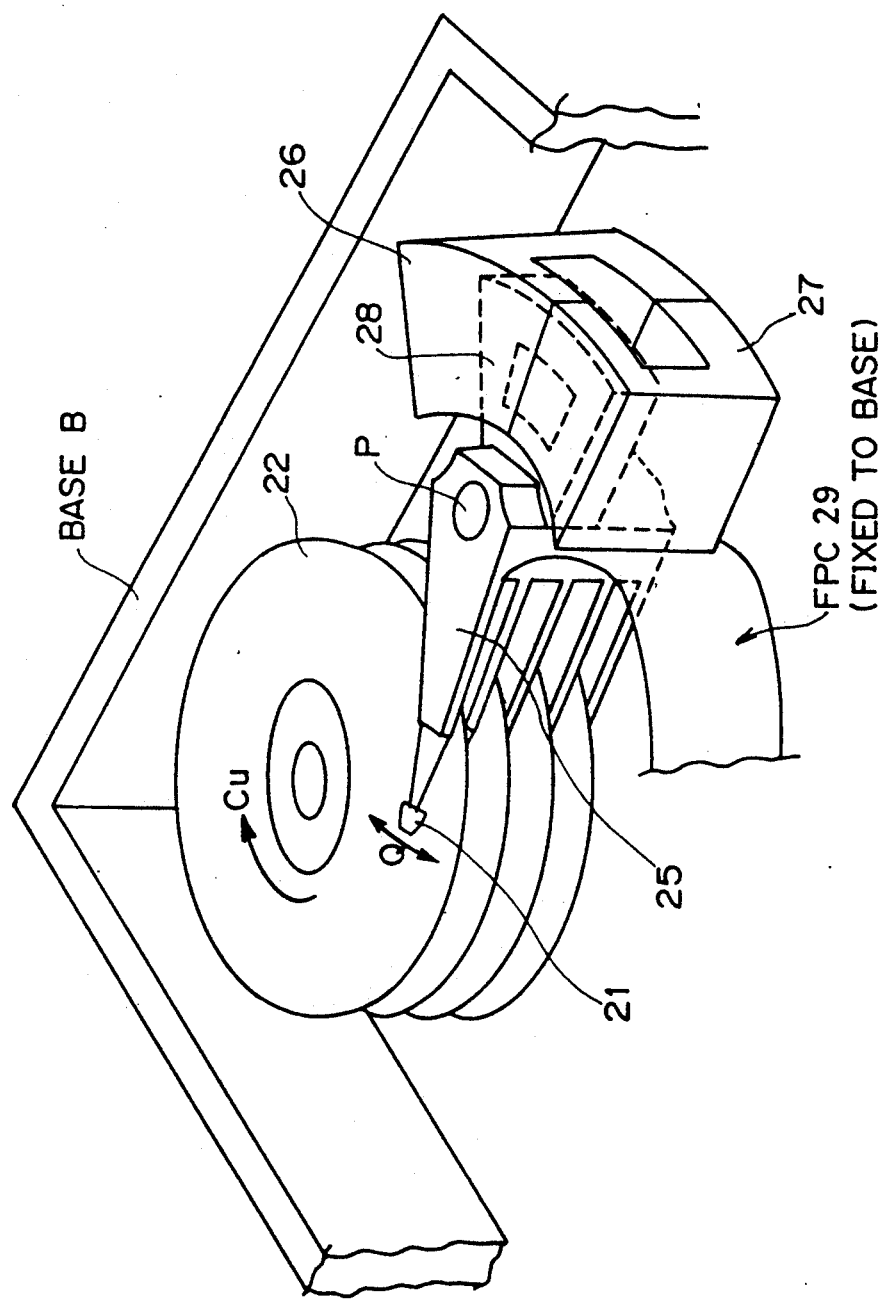
Figure 7B:
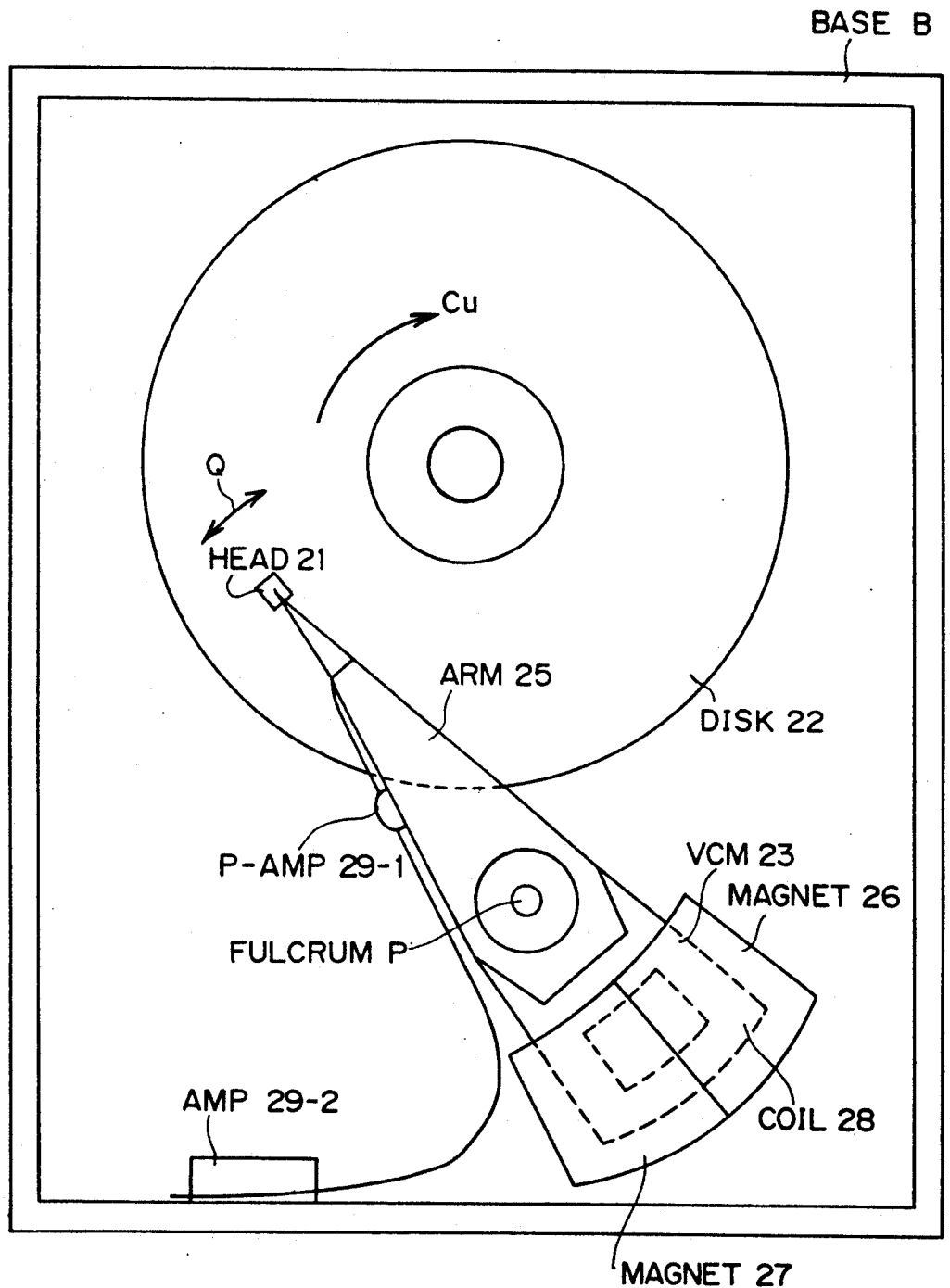
Figure 7C:
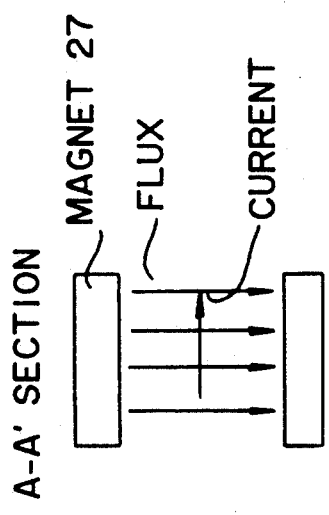
Figure 7C:
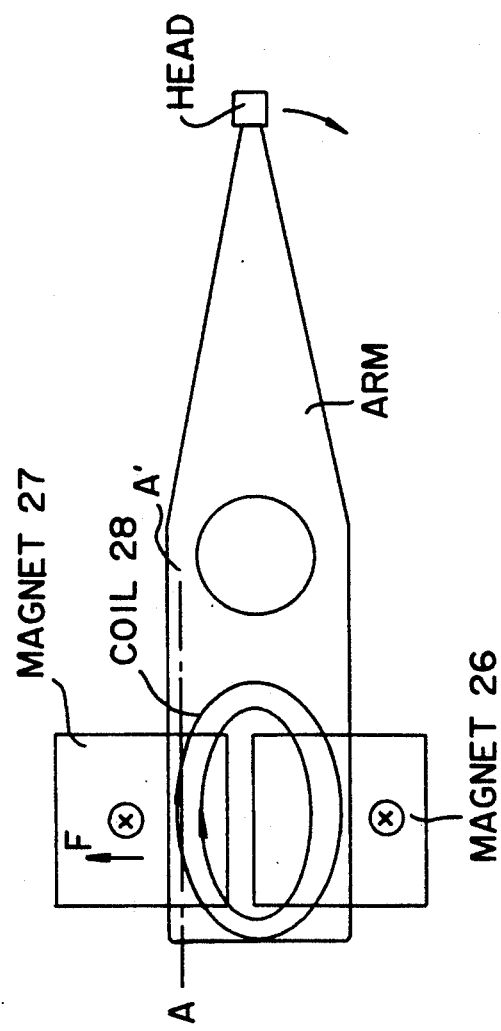
Figure 8A:
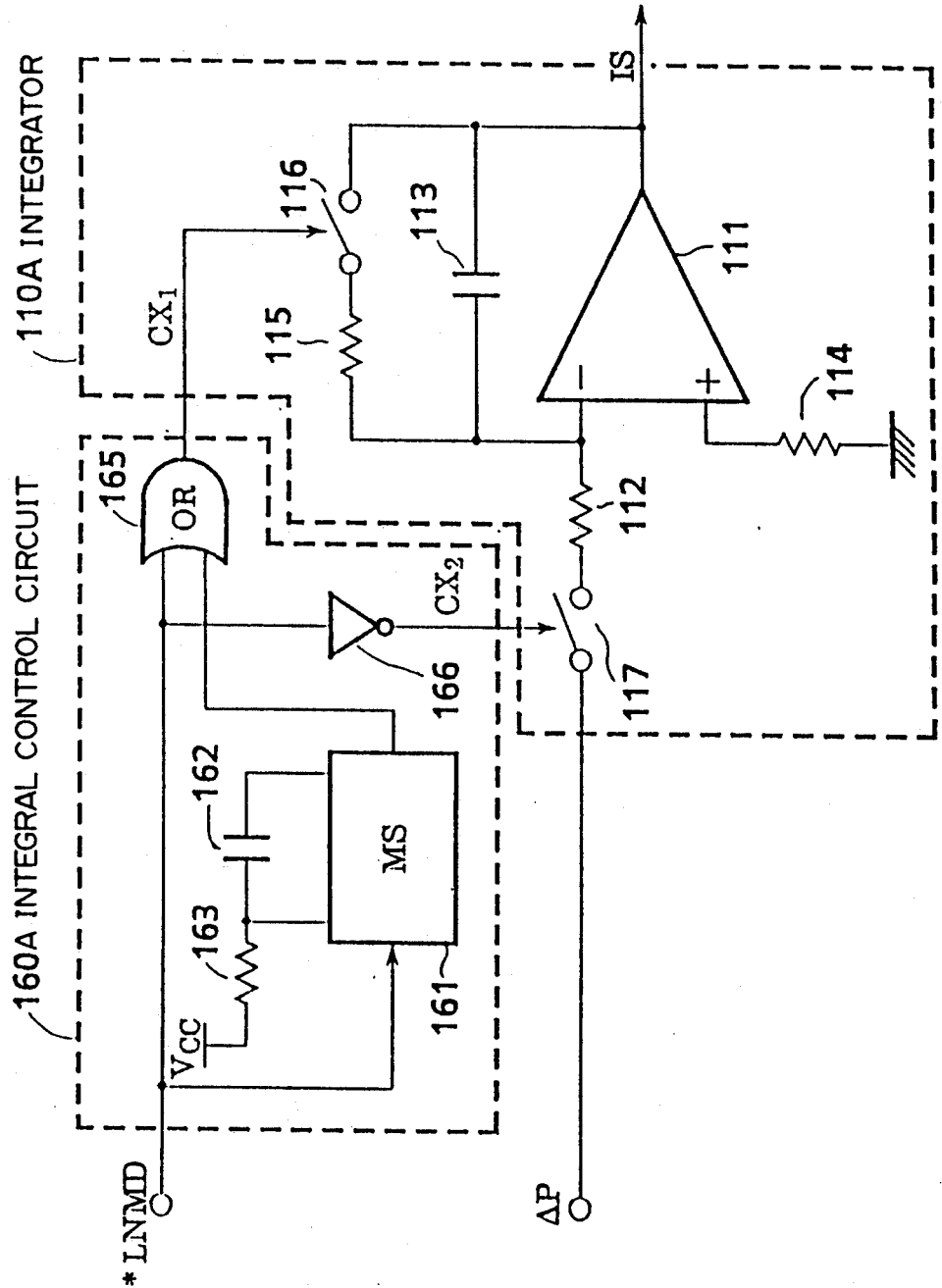
FIG. 8A illustrates another embodiment of the present invention, FIG. 8B(a)–8B(d) are timing diagrams of the integrator and the integral control circuit of FIG. 8A, FIGS. 9A(a)–9A(b) illustrate signal waveforms in a prior art control system when external force does not vary, FIGS. 9B(a)–9B(b) illustrate signal waveforms in the prior control system when external force varies, and FIGS. 9C(a)–9C(b) illustrate signal waveforms in the present invention when external force varies.

The position control device of the present invention will be described with reference to FIGS. 4A–4C through 7A–7C. FIG. 5 is a block diagram of an embodiment of the present invention and FIG. 6A illustrates specific arrangements of the integrator and the integral control circuit of FIG. 5. FIG. 6B is a timing diagram of the integrator and the integral control circuit of FIG. 6A. FIGS. 7A and 7B are views of a disk device which is a servo-controlled system of the invention. FIG. 8A illustrates modified arrangements of the integrator and the integral control circuit and FIG. 8B is a timing diagram of the modified integrator and integral control circuit. The operational waveform diagram of FIGS. 4A to 4B will also be used in the embodiment of the present invention.

In FIG. 5, servo circuit 10, position control circuit 11, integrator 110A, integral control circuit 160, servo-controlled system 20, head 21 and disk 22 are the same as those in FIG. 3.

In the servo circuit 10, a speed control circuit 12 produces a speed error signal $\Delta V_E$ indicating a difference between the current speed Vr and a predetermined target speed of the head 21 to perform speed control enabling the head 21 to gain access to a selected cylinder at high speed. The current speed Vr of the head 21 is determined from its position signal Ps. Also, the target speed Vs of the head 21 is obtained from data DiF, entered from a controller (to be described later) into the speed control circuit 12, which indicates an amount of difference between the selected track and the current track on which the head 21 (servo-controlled head 21s) stays, i.e., a residual seek amount, and a previously set look-up table (not shown) indicating a correspondence between difference amounts and set speeds.

A power amplifier 13 receives a linear mode signal (hereinafter referred to as an *LNMD signal) from the controller. In accordance with this signal, a speed error signal $\Delta V_E$ from the speed control circuit 12 is amplified at the time of speed control up to a predetermined level for application to the servo-controlled system 20, and a position error signal $\Delta P_E$ from the position control circuit 11 is amplified at the time of position control up to a predetermined level for application to the servo-controlled system 20. A current proportional to $\Delta V_E$ or $\Delta P_E$ is supplied to the servo-controlled system 20. This current is indicated by a control current Ic.

A position demodulation circuit 14 is adapted to demodulate a read signal from the head 21 (servo head 21s) to produce a position signal Ps which specifies the current position of the head. The position signal Ps is applied to the position control circuit 11 and the speed control circuit 12. The position demodulation circuit also detects a point of time at which the head 21 crosses a track (cylinder) to produce a track crossing pulse signal (hereinafter referred to as a TXPL signal) which is supplied to the controller.

A controller 15 controls the operation of various circuits of the servo circuit 10. The controller 15 is also responsive to TXPL signals supplied from position demodulation circuit 14 to calculate the position of a current cylinder on which the head 21 is placed and then find the previously set difference amount DiF between the current cylinder and the selected cylinder for application to the speed control circuit 12. Moreover, the controller 15 generates an *LNMD signal, which specifies either the speed control or the position control, for application to the position control circuit 11 and the power amplifier 13. The *LNMD signal specifies the speed control when it is at a high (H) level and the position control when it is at a low (L) level.

In the position control circuit 11, 120 designates a differentiator and 130 designates a proportional circuit, which performs the PID action together with the integrator 110A. The outputs of the differentiator 120 and proportional circuit 130 are represented by DS and PS, respectively.

An adder 140 is adapted to generate an error signal $\Delta P$ indicating a difference between the position signal Ps from the position demodulation circuit 14 and a signal Po representing the previously set selected track position for application to the integrator 110A, differentiator 120 and proportional circuit 130.

An adder 150 adds the output signals IS, DS and $\Delta P_E$ of a) the integrator 110A, b) differentiator 120 and c) proportional circuit 130 to produce a position error signal $\Delta P_E$.

In the servo-controlled system 20, 23 denotes a voice coil motor (VCM) 23 is responsive to the control current Ic from the power amplifier 13 to move the head 21. The disk device of the embodiment is a multi-head, multi-disk device. One of the heads 21s is used as a servo head and one of the disks 22s is used as a servo disk.

The specific arrangements of the integrator 110A and the integral control circuit 160 are described in sections (C) and (D) below.

The seek control operation of FIG. 5 is explained under the headings of speed control and position control.

(1) Speed control

In seek control, to place the head 21 on a selected track of the disk 22, speed (coarse) control is first performed to cause the head 21 to gain fast access to a selected cylinder. However, the speed control is not directly related to the position control of the embodiment and thus will only be explained briefly.

For speed control, the controller 15 sets the *LNMD signal at H level to direct the power amplifier 13 to speed control.

Position demodulation circuit 14 demodulates a read signal of the servo disk 22s supplied from the servo head 21s to obtain a position signal Ps of the servo head 21s (head 21) and apply it to the speed control circuit 12. Also, the position demodulation circuit 14 produces a TXPL signal each time the servo head 21s (head 21) crosses a track (cylinder) for application to the controller 15.

The controller 15 calculates the position of the current cylinder on which the servo head 21s is placed in accordance with the TXPL signal and finds the previously set difference amount DiF with respect to the selected cylinder for application to the speed control circuit 12.

The speed control circuit 12 obtains a target speed Vs according to the difference amount and differentiates the position signal Ps supplied from the position demodulation circuit 14 to calculate the current speed Vr of the servo head 21s. The speed control circuit 12 generates a speed error signal $\Delta V_E$ indicating an error between the target speed Vs and the current speed Vr for application to the power amplifier 13. The current speed Vr is also sent to the controller 15.

The power amplifier 13 amplifies the speed error signal $\Delta V_E$ up to a predetermined level to generate a control current Ic and supply it to the VCM 23. In response to the control current Ic, the VCM 23 drives the head 21 (inclusive of the servo head 21s) in the direction of the selected cylinder.

Subsequently, the speed control is performed by the servo loop formed of head 21 (servo head 21s), position demodulation circuit 14, controller 15, speed control circuit 12, power amplifier 13, VCM 23 and head 21 (servo head 21s).

When the servo head 21s (head 21) arrives at the selected cylinder, its speed is lowered to 0 and thus its current speed Vr is also lowered to 0.

The controller 15 detects that the servo head 21s has arrived at the selected cylinder, that is, the speed control has terminated, from the fact that the current speed Vr supplied from the speed control circuit 12 has reduced to 0. As a result, the controller 15 switches the control mode from speed control to position control to switch the *LNMD signal supplied to the position control circuit 11 and power amplifier 13 from H level to L level.

(2) Position control operation

With the position control, the position control circuit 14 demodulates a read signal read from the servo disk 22s by the servo head 21s to obtain a position signal Ps of the servo head 21s (head 21) and supply it to the position control circuit 11. It is assumed that the position signal Ps involves a transient oscillation such as that shown in FIG. 4A.

The adder 140 of the position control circuit 11 generates an error signal $\Delta P$ indicating a difference between the current position of the head indicated by the position signal Ps entered thereinto and the position of the selected track which has been set in advance, the error signal being supplied to the integrator 110A, differentiator 120 and proportional circuit 130.

The integral control circuit 160 is responsive to application of the *LNMD signal at L level to generate a HOLD signal, which has a predetermined duration Th of less than one-track seek time Ts of the head 21, for application to the integrator 110A. The duration Th of the HOLD signal is selected to be approximately 70% of Ts. A specific arrangement and operation of the integrator 160 is described below in sections (C) and (D) with reference to FIGS. 6A-6B to 8A-8B.

The integrator 110A integrates the error signal $\Delta P$ supplied from the adder 140 to produce an integrated signal IS for application to the adder 150. The differentiator 120 differentiates the error signal $\Delta P$ to produce a differentiated signal DS for application to the adder 150. The proportional circuit 130 amplifies the error signal to produce a proportional signal for application to the adder 150. It is to be noted that, as described above, the integrator 110A starts its integral action after predetermined time Th has elapsed from when the position control is initiated. Due to this integral action, the integrator 110A can be made immune to a large transient oscillation which might be involved in the position signal Ps, as shown in FIG. 4A, and generate an oscillation-free, stable integrated signal as shown in FIG. 4B. A specific arrangement and operation of the integrator 110A is described below in the sections (C) and (D) with reference to FIGS. 6A-6B to 8A-8B.

The adder 150 adds output signals of the integrator 110A, differentiator 120 and proportional circuit 130 to produce a position error signal $\Delta P_E$ for application to the power amplifier 13. The power amplifier 13 amplifies position error signal $\Delta P_E$ up to a predetermined level to generate a control current Ic for application to the VCM 23.

The VCM 23 drives the head 21 (including servo head 21s) in the direction of the selected cylinder in accordance with control current Ic.

Subsequently, the position control is performed by a servo loop of head 21 (servo head 21s), position demodulation circuit 14, position control circuit 11, power amplifier 13, VCM 23 and head 21 (inclusive of servo head 21s).

In this case, even if the head 21 in an on-track state is subjected to a large transient oscillation because of a variation in external force, the integrator 110A can perform its predetermined integral action stably without being affected by the oscillation described above. Hence, the combined influence of variations in the position signal Ps of the head 21 and integrated signal IS (hence position error signal $\Delta P_E$) will be effectively suppressed so that both the signals converge stably and rapidly as shown in FIGS. 4A and 4B. Consequently, the settling of the head 21 can be stabilized.

(C) Arrangements and operation of integrator 110A and integral control circuit 160

Arrangements and operation of the integrator 110A and the integral control circuit 160 will now be described with reference to FIGS. 6A and 6B.

In the integrator 110A of FIG. 6A, 111 designates an operational amplifier having a resistor 112 connected to its inverted input and capacitor 113 connected between its output and inverted input, the resistor and the capacitor defining an integral time constant. A compensating resistor 114 compensates for the offset of the operational amplifier 111.

A series combination of a resistor 115 and an analog switch is connected across the capacitor 113. The switch 116 is turned on or off by the *LNMD signal. The switch 116 is open when the *LNMD signal is at a L level and closed when the *LNMD signal is at H level. An analog switch 117 is connected to the input end of the resistance 112.

In the integral control circuit 160, a monostable multivibrator 161 (hereinafter abbreviated to MS) produces a HOLD signal defining an operation halt time Th of the integrator 110A. The HOLD signal goes to H level when the *LNMD signal falls and goes back to L level after a specific time period has elapsed. A capacitor 162 and a resistor 163, connected to the MS 161, form a time constant circuit which defines the time period TH.

An AND circuit 164 receives the *LNMD signal and the HOLD signal from the MS 161 to produce a switch signal CX at H level when they are both at L level. The switching signal CX is applied to the switch 117 of the integrator 110A. The switch 117 is closed when the switching signal CX is at H level.

Next, the operation of the integrator and the integral control circuit of FIG. 6A is described in conjunction with the timing diagram of FIG. 6B.

To initiate position control or one-track seek after termination of the speed control, the *LNMD signal is first switched from H level to L level at time t1.

The *LNMD signal at L level is applied to the power amplifier 13 and the MS 161 of the position control circuit 11.

In response to the *LNMD signal going from H level to L level, the power amplifier 13 selects and amplifies the position error signal $\Delta P_E$ from the position control circuit 11.

The MS 161 is responsive to application of the *LNMD signal to produce a HOLD signal at H level having a duration Th defined by the capacitor 162 and the resistor 163. This HOLD signal is applied to an input of the AND circuit 164. The AND circuit 164 is supplied at its other input with the *LNMD signal at L level. As a result, the switching signal CX that the AND circuit 164 produces is held at L level for the period Th during which the HOLD signal at L level is supplied. Thus, the switch 117 of the integrator 110A is open for time Th. That is, the switch 117 also remains open during the time period t1-t2, as it does before t1.

The switch 116 is closed when the *LNMD signal is at H level. At this point the output of the operational amplifier 111, i.e., the integrated signal IS, takes an initial value of 0. This is because the switch 117 on the input side of the operational amplifier 111 is turned off when the HOLD signal is output. Thus, no input is applied to the operational amplifier bit as the capacitor 113 is discharged through the resistor 115 in the previous period in which the switch 116 is turned on, the initial value of 0 is maintained at the output of amplifier 111.

When the *LNMD signal goes to L level after the initiation of the position control, initial value0 is held. Thus, the switch 117 remains open until t2. Therefore, the error signal $\Delta P_E$ is inhibited from being applied to the operational amplifier and the integrated signal IS output from the operational amplifier is held at the initial value of 0. As a result, a variation in external force (the position error signal $\Delta P_E$) occurring during the hold period Th is not integrated. The integrated signal IS is thus prevented from varying (refer to FIGS. 4A and B).

The hold signal goes to L level after hold period Th has elapsed. Thus, both inputs of the AND circuit 164 go to L level and switching signal CX goes to H level.

In response to the switching signal CX going to H level, the switch 117 of the integrator 110A is closed. Thus, the integrator 110A starts its integral action in accordance with error signal $\Delta P_O$ applied thereto at time t2. At this point, since the variation in external force (position signal Ps) is small, the integral action will be performed stably and integrated signal IS will not vary during period t2 to t3. Therefore, the PID action is performed normally and the position signal Ps converges rapidly. Thus, the settling of the head 21 is stabilized and fast seek can be realized (refer to FIGS. 4A and 4B).

FIG. 7A is a perspective view and FIG. 7B is a plan view of a magnetic disk device forming the servo-controlled system of the present invention. FIG. 7C is a view of the head and the VCM.

Heads 21 are provided on the top and bottom side of a disk 22. When reading from the disk, the head detects the direction of magnetization of a layer of magnetic material coated on the surface of disk 22 when the disk rotates. When writing to the disk, the head magnetizes the magnetic layer in a predetermined direction. Writing and reading of the disk are made for each track or for each sector into which a track is divided. The track position can be set precisely by the position control of the VCM 23.

The VCM 23 is provided on the opposite side of the head 21 and a fulcrum P is interposed therebetween. The head 21 moves in the directions of arrows Q with an arm 25 on which the head is mounted as the VCM moves.

As shown in FIG. 7C(a)–7C(b), the VCM is comprised of a moving coil 28 and two pairs of magnets 26 and 27. The coil 28 is mounted on the arm 25. The coil 28 is moved in the direction of arrow F through the action of a current flowing through it and magnetic flux between the paired magnets 26 and between the paired magnets 27. The current Ic output from the power amplifier 13 flows through the coil 28.

The current Ic flows through a flexible printed circuit 29 (FPC). A preamplifier 29-1 and an amplifier 29-2 are connected via the FPC 29 to receive a write signal and a read signal.

The FPC 29 is necessary to cause a current to flow through the coil 28 and to transmit signals. However, the FPC 29 is a cause of the above-described external force, i.e. disturbance. Although it is flexible but relatively small in elasticity, its elasticity has some influence on the high-speed movement of the head as a counter force applied to the arm 25.

The disturbance is also generated by mechanical imbalance. This disturbance may be generated by weight imbalance, depending on the direction of installation of the device.

Furthermore, since the disks, heads and the VCM are housed within closed case, disturbance can also be generated by air flow produce by the movement of the heads.

According to the present invention, even if such disturbance occurs because of the elasticity of the FPC 29, mechanical imbalance and air flow, the influence on fast access to a selected track can be lessened.

(D) Operation of the second embodiment

The second embodiment of the present invention will be described with reference to FIG. 8A and 8B.

In FIG. 8A, like reference characters designate like parts in FIG. 6A. That is, integrator 110A is the same in arrangement as that of the embodiment of FIG. 6A. In an integral control circuit 160A, the combination of MS 161, capacitor 162 and resistor 163 is the same as that of the embodiment of FIG. 6A. Thus, it is also responsive to an *LNMD signal from controller 15 to produce a HOLD signal having a duration of Th.

An OR circuit 165 ORs the HOLD signal from the MS 161 with the *LNMD signal from the controller 15 to produce a switching signal CX1 to control the opening and closing of the switch 116 of the integrator 110A. The switch 116 is closed when the switching signal is at H level and opened when it is at L level.

An inverter 166 inverts the *LNMD signal to produce a switching signal CX2 to control the opening and closing of the switch 117 of the integrator 110A. The switch 117 is closed when the switching signal CX2 is at H level and opened when it is at L level.

Next, the position control operation of FIG. 8A is described. When a position control or one-track seek is initiated after the speed control is terminated, the controller 15 switches the *LNMD signal from H level to L level at a time t5 to command the power amplifier 13 to select the position of error signal $\Delta P_E$ from the position control circuit 11.

In response to the *LNMD signal going from H level to L level, the MS 161 produces a HOLD signal at H level having a duration of Th defined by the capacitor 162 and the resistor 163. The HOLD signal is applied to an input of the OR circuit 165, the other input of which is supplied with the *LNMD signal at L level.

Thus, the switching signal CS2 from the OR circuit 165 goes to H level for Th (t5-t6), during which the HOLD signal at H level is applied. In response to the switching signal CX2, the switch 116 of the integrator 110A is closed of Th to connect the resistor 115 in parallel with the capacitor 113. Therefore, the integral action is not performed for Th during which the HOLD signal is produced.

On receiving the *LNMD signal at L level from the controller 15, the inverter 165 inverts it to produce the switching signal CX2 at H level for application to the switch 117 of the integrator 110A.

In response to the switching signal at H level, the switch 117 is closed so that the integrator 110A receives an input (error signal $\Delta P_E$) to initiate an integral action.

However, the integral action is not performed because the switch 116 is closed by the HOLD signal during the first Th period from when the position control is initiated. At this point, the integrator 110A acts as an amplifier having a gain of R115/R112. (R115 and R112 are values of the resistors 115 and 112, respectively.) Since R112>>R115, however, the amplifier has little gain.

Consequently, the variations in external force (position signal Ps) occurring during the HOLD period Th cannot be integrated to thereby prevent the integrated signal IS from varying.

After the HOLD period (t5-t6) has elapsed, the HOLD signal (MS") goes to L level so that the switching signal CX1 output from the OR circuit goes to L level.

On receiving the switching signal CX1, the switch 116 is opened, thus causing the integrator 110A to initiate the integral action. At this point, since the amplitude of external force (position signal Ps) is small, the integral action is performed stably and a variation is not produced in the integrated signal IS. Therefore, in this embodiment as well, the PID action is normally performed so that the position signal Ps converges rapidly during the period t6 to t7, the settling of the head 21 is stabilized and the fast seek is realized.

(E) Comparison between signal waveforms

The present invention will be described in more detail in conjunction with actual signal waveforms (FIGS. 9A(a)-9A(b) to 9C(a)-9C(b)) at the time of a one-track seek.

Figure 9A:
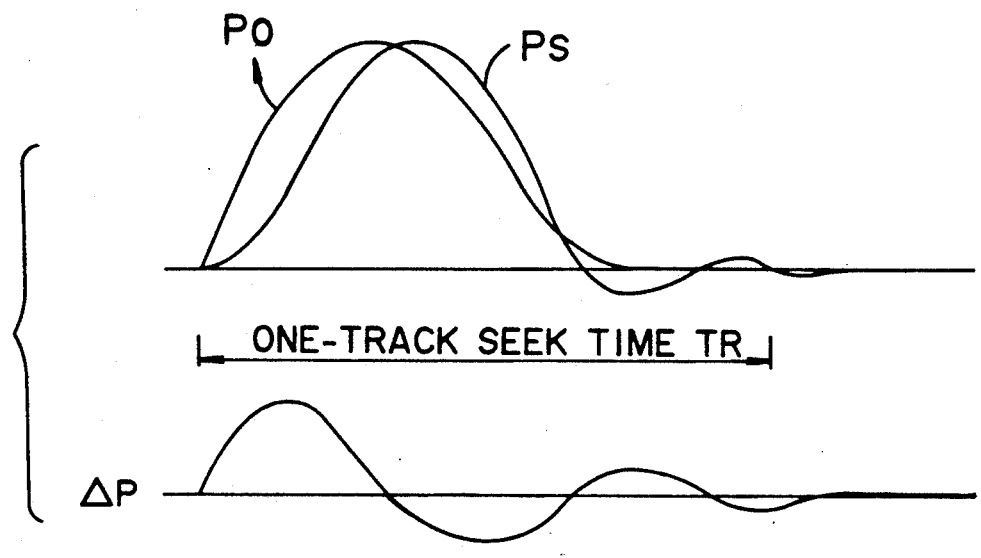
Figure 9A:
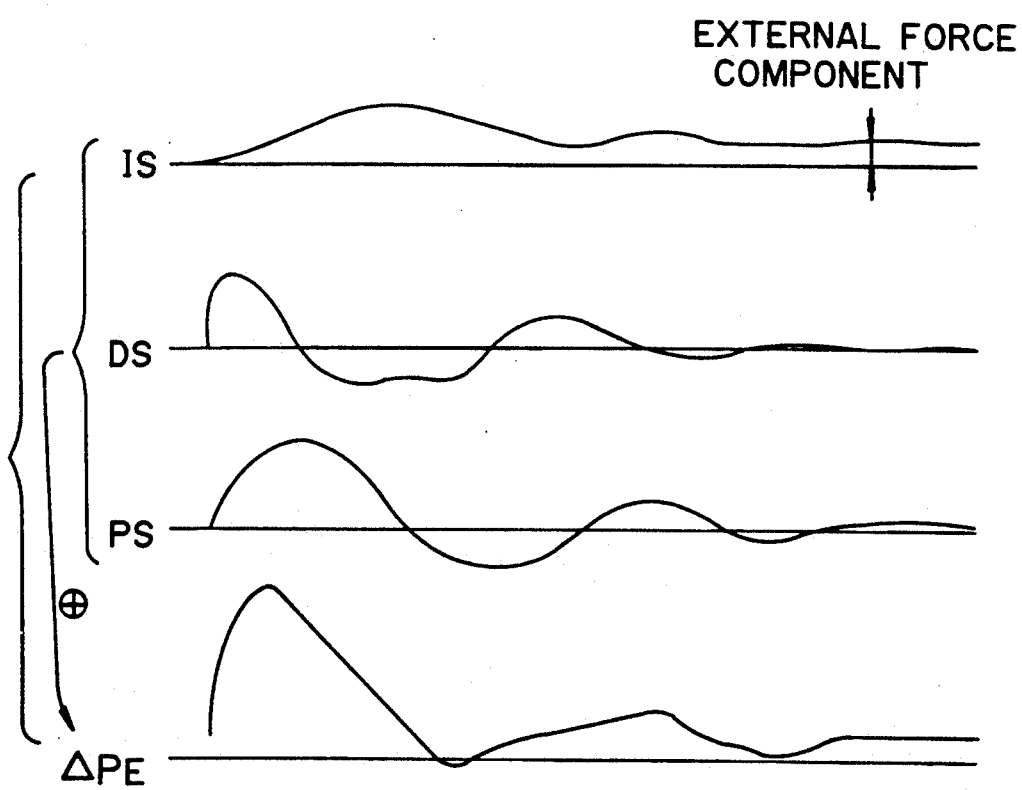

FIGS. 9A(a)-9A(b) illustrate signal waveforms when there is no variation in external force. The error of signal $\Delta P_E$, which indicates a difference between a position signal Po in a selected position and a position signal Ps, converges after about two fluctuations in the positive and negative directions.

Figure 9B:
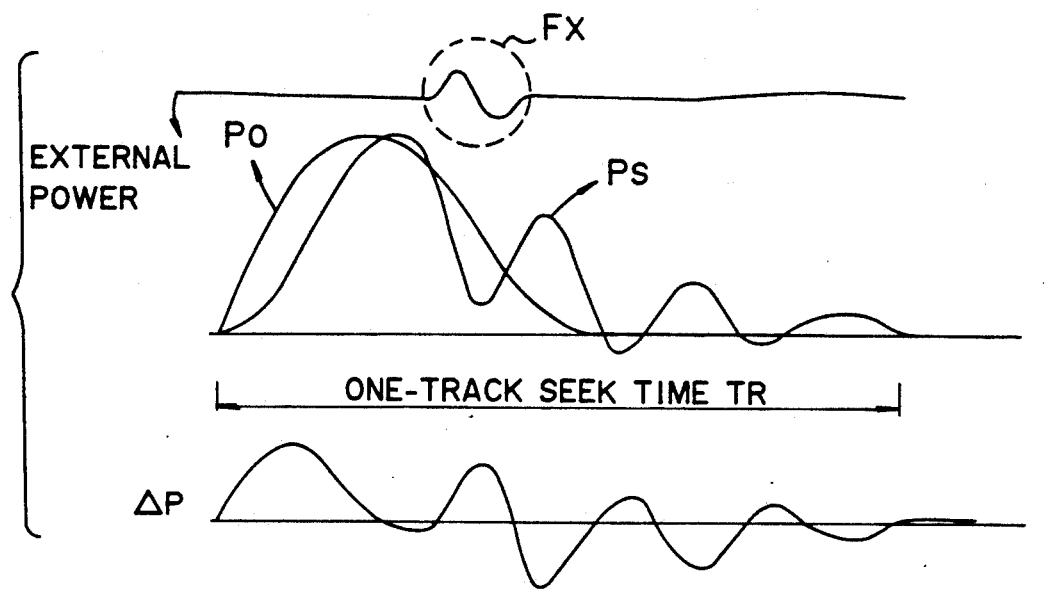
Figure 9B:
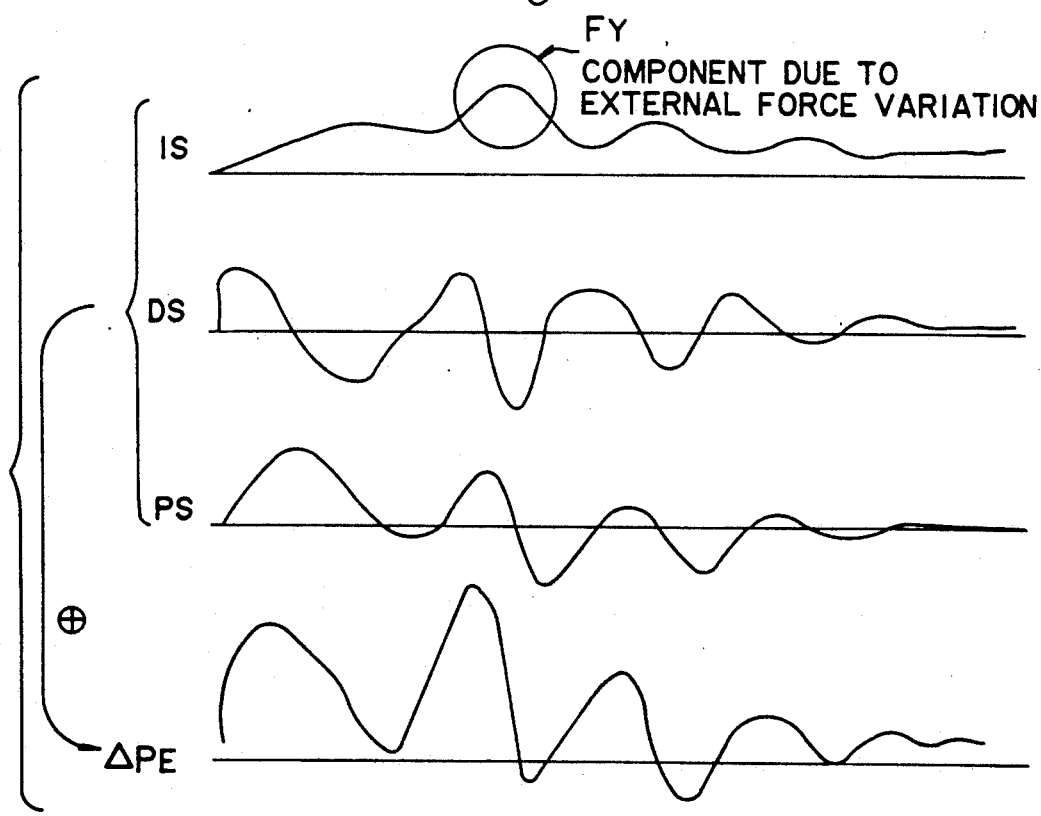
Figure 9C:
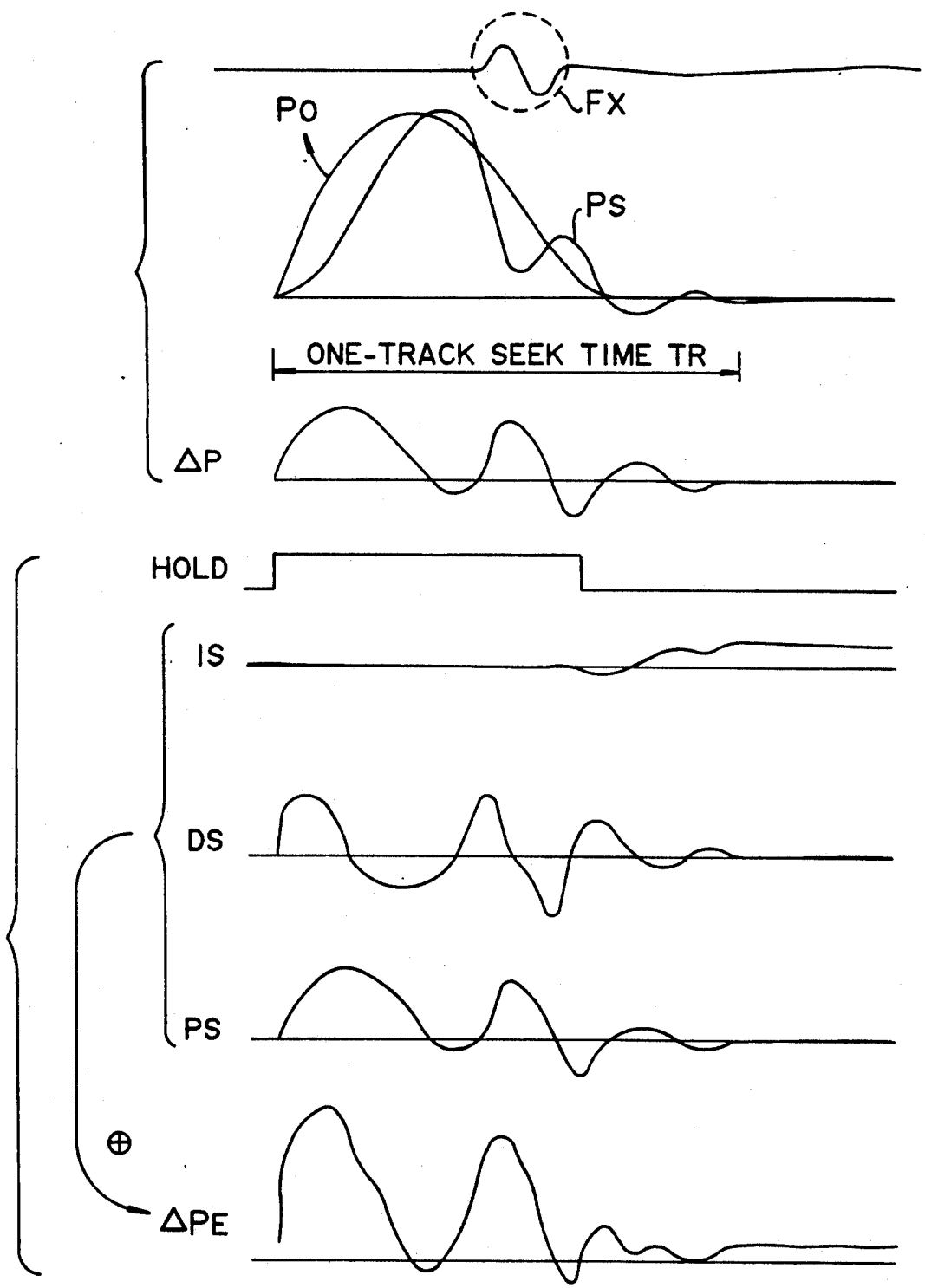

FIGS. 9B(a)-9B(b) illustrate signal waveforms in the prior art system when there is a variation Fx in external force. The output IS of the integrator 110A has a variation Fy due to the variation Fx in external force. Thus, a one-track seek time becomes longer than in FIGS. 9A(a)-9A(b). In contrast, according to the position control of the present invention, the error signal $\Delta P_E$ is interrupted for about 70% of one-track seek time TR, as shown in FIGS. 9C(a)-9C(b). Thus, a variation in external force is not integrated for that time period. Hence, the head can gain access to a selected track in one track seek time TR, which is substantially the same as that when there is no variation in external force. The above describes how the one-track seek time TS can be shortened even if there is a variation in external force. The present invention can not only lessen the influence of the variation Fx in external force but also shorten on-track seek time TR even where there is no variation in external force. For example, as can be seen by comparing FIGS. 9A(a)-9A(b) and 9C(a)-9C(b), the position signal can converge more rapidly when the integration is temporarily held. That is, according to the present invention, by providing integration holding time for the integrator, the one-track seek time can be made shorter than before.

Although only two embodiments of the present invention have been described and disclosed, it is apparent that other embodiments and modifications are possible. For example, the integrator 110A may be applied to a case where an integral plus proportional action is performed as well as a case where a PID action is performed. The HOLD signal may be generated by a counter in place of the MS 161.

As described above, the present invention can provide the following advantages.

(1) Since the integral action of the integrator in the position control circuit is stopped only for a predetermined period corresponding to a transient oscillation period of the head after the position control is initiated, the integrator can be made immune to a large transient oscillation which might occur in the head because of a variation in external force and perform a predetermined integral action stably and properly.

(2) Because of (1), the interaction between variations in the head position signal and the integrated signal form the integrator, hence the position error signal, can be effectively suppressed, thus stabilizing the settling of the head at the time of a fast seek and realizing a stable and fast seek.

What is claimed is:

1. A position control circuit for use in a servo circuit for generating a position error signal corresponding to a position error between a head and a selected track of a disk at a time of position control and positioning said head on said selected track, comprising:

an integrator means for integrating said position error, of the position of said head and the position of said selected track, to generate an integrated signal which is one component of said position error signal generated by said position control circuit; and an integral control circuit means for stopping the integral action of said integrator for a predetermined period shorter than a one-track seek time after the position control is initiated.

2. In a servo circuit for controlling a speed of a head to move said head to a vicinity of a selected track in moving said head to said selected track, a position control circuit for performing position control to position said head on said selected track after speed control is terminated, said position control circuit comprising:

a proportional circuit means for producing a signal proportional to a position error, said position error indicating a difference between a current position of the head and a selected track position;

an integrating circuit means for integrating said position error to produce an integrated signal;

an adder means for adding an output signal of said proportional circuit and an output signal of said integrating circuit to produce a drive signal for a voice coil motor; and an integral control circuit means for stopping the integral action of said integrating circuit for a predetermined period of time after the position control is initiated.

3. A position control circuit according to claim 2, further comprising a differentiating circuit for differentiating said position error, and in which said adder means adds output signals of said proportional circuit means, said integrating circuit means and said differentiating circuit means.

4. The position control circuit according to any one of claims 2 or 3, further comprising a controller means for driving a speed control circuit for performing said speed control at a time of initiating a movement of said head to move said head to the vicinity of said selected track and then producing a position control signal to drive said position control circuit.

5. The position control circuit according to claim 4, wherein said controller outputs said position control signal without operating said speed control circuit at a time of one-track seek.

6. The position control circuit according to claim 2, wherein said integrating circuit means comprises an inverting amplifier, a first resistor having an end connected to an input terminal of said integrating circuit via a first switch and the other end connected to an input terminal of said inverting amplifier, a capacitor having an end connected to said input terminal of said inverting amplifier and the other end connected to an output terminal of said inverting amplifier, and a series combination of a second switch and a second resistor connected in parallel with said capacitor.

7. The position control circuit according to claim 6, wherein said integral control circuit means comprises a one-shot multivibrator responsive to application of a position control signal thereto for producing a pulse with a predetermined duration, and a circuit for turning said first switch on and turning said second switch off when said position control signal is applied after said one-shot multivibrator has terminated said pulse.

8. The position control circuit according to claim 2, wherein said position error indicates a difference between the current position of said head and the position of a selected track for one-track seek.

9. The position control circuit according to claim 2, further comprising a position demodulation circuit for demodulating the current position of said head from a signal read from a disk by a servo head provided for position control, and wherein said voice coil motor simultaneously moves at least one data head for reading and writing data and said servo head.

* * * * *